United States Patent [19]

Ueda

[11] Patent Number: 4,757,299

[45] Date of Patent: Jul. 12, 1988

[54] INDICATION DEVICE FOR VEHICLE

[75] Inventor: Masahiro Ueda, Toyota, Japan

[73] Assignee: Toyota Jidosha Kabushiki Kaisha, Toyota, Japan

[21] Appl. No.: 29,366

[22] Filed: Mar. 23, 1987

Related U.S. Application Data

[62] Division of Ser. No. 496,668, May 20, 1983, abandoned.

[30] Foreign Application Priority Data

Oct. 19, 1982 [JP] Japan ................................ 57-183335

[51] Int. Cl.[4] ................................................ B60Q 1/00

[52] U.S. Cl. ................................ 340/52 F; 340/52 R; 307/10 R

[58] Field of Search .................... 340/52 R, 52 F, 521, 340/522, 506, 507, 525; 364/424.1, 424; 116/28.1, 56; 307/10 R

[56] References Cited

U.S. PATENT DOCUMENTS

| | | | |
|---|---|---|---|
| 4,222,031 | 9/1980 | Okamoto et al. | 340/525 |
| 4,338,832 | 7/1982 | Pelligrino | 364/424.1 |
| 4,425,620 | 1/1984 | Batoheller et al. | 340/52 F |
| 4,523,281 | 6/1985 | Noda et al. | 364/424.1 |
| 4,542,460 | 9/1985 | Weber | 364/424.1 |
| 4,555,694 | 11/1985 | Yanagishima et al. | 340/52 R |

FOREIGN PATENT DOCUMENTS

| | | | |
|---|---|---|---|
| 0047807 | 7/1978 | Japan | 340/52 F |

*Primary Examiner*—John W. Caldwell, Sr.
*Assistant Examiner*—Tyrone Queen
*Attorney, Agent, or Firm*—Cushman, Darby & Cushman

[57] ABSTRACT

An indicating device mounted on a vehicle, provided with an operational circuit having a plurality of vehicle control modes for indicating both a control operational circuit such as the occurrence of a trouble. The selection of the vehicle control mode is effected by a selective switch and a mode selection signal is fed to a mode selection input terminal of the operational circuit. Indicating elements are connected to this mode selection input terminal to indicate the mode. Outputs from the operational circuit are fed to the indicating elements through the mode selection input terminals, whereby the indicating elements combinedly function as the mode indicator and the output indicator.

10 Claims, 8 Drawing Sheets

INDICATION DEVICE FOR VEHICLE

This is a division of application Ser. No. 496,668, filed May 20, 1983, which was abandoned upon the filing hereof.

BACKGROUND OF THE INVENTION

1. Field of the Invention

This invention relates to indication devices for vehicles, and more particularly to improvements in an indication device for a vehicle wherein a mode and its output of an operational circuit for controlling the vehicle are indicated.

With the developments in electronics in recent years, electronic control of vehicles has advanced, thereby enabling an alleviation of the burden an drivers and enabling more comfortable driving. In order to effect the above-described electronic control, it suffice to require a driver to only select a desired control mode by a selective switch, whereby, after the control mode is selected, various types of controls of the vehicle instructed by the aforesaid control mode is automatically carried out by an operational circuit such as a microcomputer.

In consequence, in order to reliably effect the above-described control, it is necessary to cause a driver to positively recognize the thus selected control mode. Further, when the vehicle cannot be controlled by the thus selected control mode from some cause or other, it is necessary to inform the driver of it.

For this reason, indicating elements for indicating the control modes of the operational circuit are normally provided on an indication panel near the driver's seat. Further, when the vehicle cannot be controlled by the selected control mode from some cause or other, a self diagnosing function provided in the operational circuit is operated, whereby this trouble has been indicated by another indicating element for the exclusive use of such an indication provided on the indication panel separately of the aforesaid indicating element.

However, the provision of the indicating elements for indicating the control modes of the operational circuit and indicating the troubles of the operational circuit separately of each other as described above is disadvantageous in that the indicating elements, distributing cords and output terminals of the operational circuit in use are increased in number, the indication device is complicated in construction and the costs are increased.

Further, the thus increased number of the indicating elements in use as described above leads to lowered ease of reading the indication panel, on which these indicating elements are provided, and a possibility of disabling the driver from positively recognizing the control mode and its output of the operational circuit.

SUMMARY OF THE INVENTION

The present invention has been developed to obviate the above-described disadvantages of the prior art and has as its object the provision of an indication device for a vehicle, capable of indicating both modes of the operational circuit and outputs thereof with high easiness in reading and being simplified in construction.

To this end, the device according to the present invention comprises a selective switch for inputting mode selection signals to respective mode selection input terminals in order to select a mode of an operational circuit for controlling the vehicle, and indicating elements connected to the aforesaid mode selection input terminals for the mode indication; outputs from the operational circuit are fed to the indicating elements through the mode selection input terminals of the operational circuit; and the indicating elements are caused to indicate both the modes and outputs of the operational circuit.

DETAILED DESCRIPTION OF THE PREFERRED EMBODIMENT

Description will hereunder be given of the preferred embodiment of the present invention with reference to the drawings.

Figure 1:
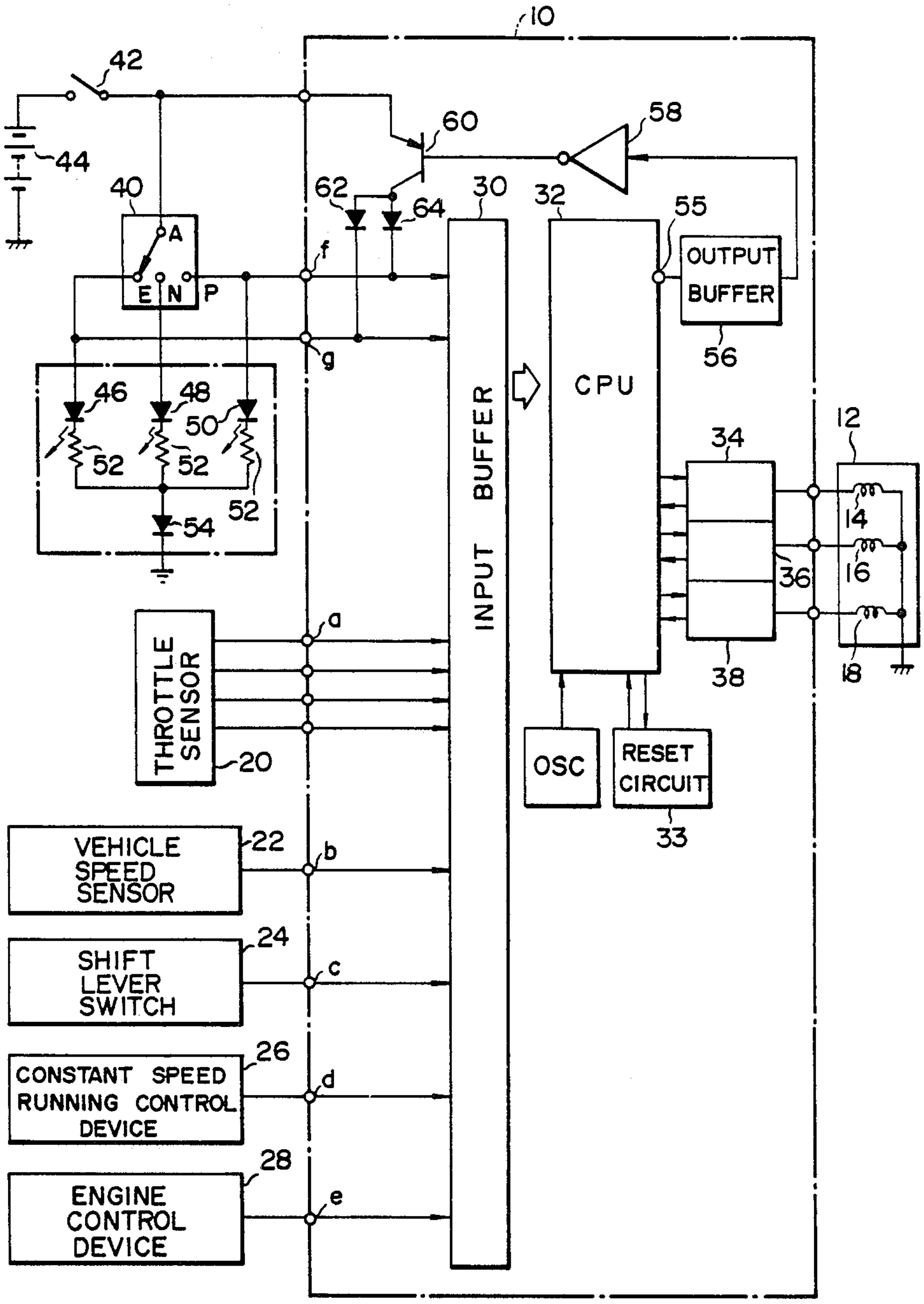
FIG. 1 is a circuit diagram showing a preferred embodiment of the indication device for a vehicle using the indicating elements for a vehicle according to the present invention.

FIG. 1 shows the preferred embodiment of the indication device for a vehicle according to the present invention. In this embodiment, an operational circuit 10 for controlling the vehicle effects the control of an automatic transmission device 12 of the vehicle.

This automatic transmission device 12 comprises a first shift solenoid 14, a second shift solenoid 16 and a lockup solenoid 18. The first shift solenoid 14 and the second shift solenoid 16 are selectively excited by four combinations therebetween, and a first speed region, a second speed region, a third speed region or an overdrive region is selectively specified. The lockup solenoid 18 is adapted to drivingly control a lockup means provided in parallel with a torque converter, not shown, and, the excitation of this lockup solenoid 18 is controlled, so that selection can be made as to either an output from an engine is imparted to an output side through the torque converter or the output is directly imparted to the output side without requiring the torque converter.

To cause the operational circuit 10 to effect the above-described control of the automatic transmission device 12, signals outputted from a throttle sensor 20, a vehicle speed sensor 22, a shift lever switch 24, a constant speed running control device 26 and an engine control device 28 are inputted to respective input terminals a, b, c, d and e of the operational circuit 10, respectively. Here, the throttle sensor 20 comprises a single idle contact and three pattern contacts, and throttle openings corresponding to combinations of three pattern contacts are detected. Additionally, the shift lever switch 24 is adapted to detect a reverse range (R range), a drive range (D range), a low range (L range) and a second range (S range), all of which are set by the shift lever. The constant speed running control device 26 is adapted to output an overdrive signal cut signal or O/D cut signal when a deceleration of more than 10 km/h for example occurs during running within the overdrive region. The engine control device 28 is adapted to output a lockup prohibition signal when the engine is low in temperature.

The signals thus inputted to the operational circuit 10 are inputted to a CPU 32 through an input buffer 30. In response to the respective signals thus inputted, the CPU 32 controls the first and second shift solenoids 14 and 16 through detector circuits 34 and 36 to control the vehicle in an optimum speed region and also control the lockup solenoid 18 through a detector circuit 38 to effect a proper lockup. These controls by means of the CPU 32 are reset by a reset circuit 33 actuated by the operation of an ignition switch 42.

In controlling the automatic transmission device 12 as described above, in the device of this embodiment, the running mode can be changed over to an economy mode, a normal mode or a power mode by means of a selective switch 40.

Here, the economy mode contemplates a running mode where an economical driving of the vehicle is instructed, the normal mode contemplates a running mode where a driving under normal conditions is instructed, and the power mode contemplates a running mode where a high torque output is instructed during running or an upward slope and the like.

In the embodiment, the selective switch 40 to instruct the respective running modes as described above comprises a single stationary terminal A and three change-over terminals E, N and P, a positive voltage from a battery power source 44 is applied to the stationary terminal A through the ignition switch 42, and outputs from the change-over terminals E, N and p are inputted to the input buffer 30 through mode selection input terminals f and g of the operational circuit 10.

The running modes thus selected by the selective switch 40 as described above are indicated by mode indicating elements 46, 48 and 50 provided on an indication panel of a driver's seat. In the embodiment, discrete display elements, embodied as light-emitting diodes are used in these indicating elements 46, 48 and 5O. The anodes thereof are connected to the change-over terminals E, N and P of the selective switch 40, respectively, and the cathodes thereof are grounded through a resistor 52 and a diode 54.

In consequence, in the selective switch 40, if the change-over terminal E is selected, then the indicating element 46 is turned "ON", whereby the selection of the economy mode is indicated. If the change-over terminal N is selected, then the indicating element 48 is turned "ON", whereby the selection of the normal mode is indicated. If the change-over terminal P is selected, then the indicating element 50 is turned "ON", whereby the selection of the power mode is indicated.

When the various running modes are selected by the selective switch 40, the CPU 32 controls the automatic transmission device 12 and other components mounted on the vehicle in response to signals inputted thereto through the input buffer 30 so as to control the vehicle in accordance with any one of the modes including the economy, normal and power modes.

However, in controlling the vehicle in accordance with the thus selected running mode, there occurs a case where the vehicle cannot be controlled in accordance with the selected running mode from some cause or other. In such a case as described above, it is necessary to inform the driver of the occurrence of the trouble for allowing him to take a proper countermeasure.

For this reason, in general, in the device of this type, there is provided a self diagnosing function for detecting the occurrence of a trouble and indicating the same. In the device of the embodiment, detector circuits 34, 36 and 38 are adapted to detect a disconnection or a short-circuit in the first shift solenoid 14, the second shift solenoid 16 or the lockup solenoid 18, and a detection signal is inputted to the CPU 32. The CPU 32 judges the occurrence of a trouble of the vehicle from a trouble signal thus inputted and outputs a signal for indicating the occurrence of the trouble from an output port 55 through an output buffer 56.

However, in order to provide indicating elements for indicating the vehicle trouble signals outputted through the output buffer 56 as described above separately of the aforesaid indicating elements 46, 48 and 50 for indicating the selected mode, it is necessary to newly provide other output terminals, whereby the device as a whole becomes complicated in construction, and the indication panel, on which the indicating elements are provided, becomes complicated in arrangement thereof, thus causing lowered easiness in reading thereof.

The characteristic feature of the present invention resides in obviating the disadvantage occurring due to the provision of the indicating element for indicating the output from the operational circuit 10 separately of the indicating elements 46, 48 and 50 for indicating the selection made by the selective switch 40. For this, outputs from the operational circuit 10 are fed to the indicating elements 46 and 50 for indicating the modes through the input terminals f and g, to thereby cause these indicating elements 46 and 50 to indicate both the control modes and the outputs of the operational circuit 10.

With the above-described arrangement, the terminals provided in the operational circuit 10 and the indicating elements in use are decreased in number, the device as a whole can be simplified in construction, and moreover, the indicating elements provided on the indication panel are simplified in arrangement, thereby enabling high ease of reading thereof.

In the embodiment, when the trouble detected by the detector circuits 34, 36 and 38 has continued for a predetermined period or more, the CPU 32 outputs a trouble occurrence detection signal of a high level from the output port 55 thereof through the output beffer 56. Then the thus outputted signal of a high level is inverted by an inverter 58 into a low level and turns a transistor 60 "ON". This transistor 60 has its emitter connected to the positive side of the battery power source 44 and its collector is connected to the input terminals f and g of the operational circuit 10, respectively, through diodes 62 and 64. Because of this, when the transistor 60 is turned "ON", a voltage from the battery power source 44 is applied to the indicating elements 46 and 50, respectively, through the input terminals f and g.

In consequence, with the device of the embodiment, when only one indicating element is lighted, it is recognizable that the vehicle is normally controlled in accordance with a running mode indicated by the indicating element, and, when two or more indicating elements are lighted, it is recognizable that some trouble has been caused to the vehicle.

Figure 2:
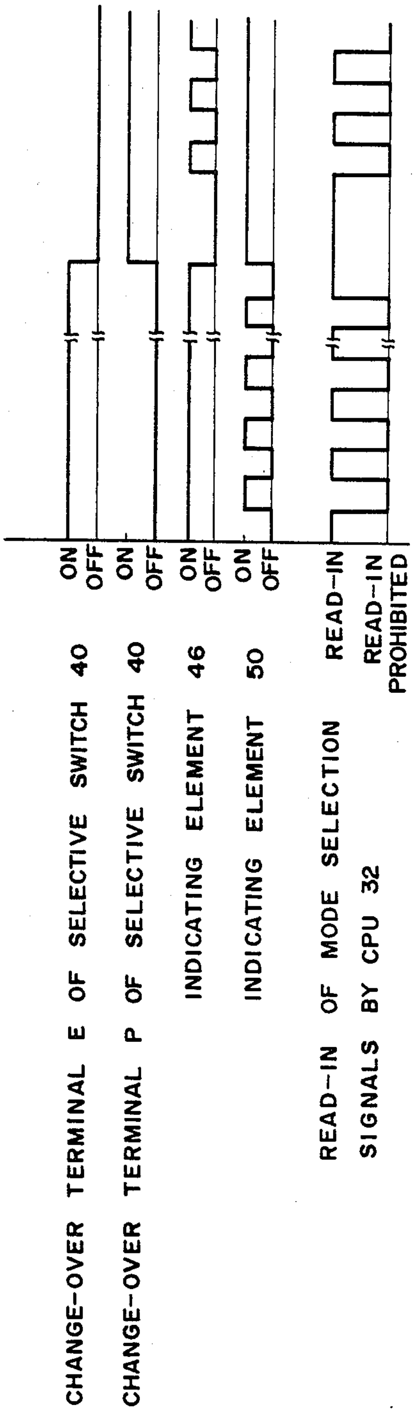
FIG. 2 is a timing chart of the device shown in FIG. 1.

In addition to the above, in the device of the embodiment, each of the running modes selected by the selective switch 40 is indicated by the continuous lighting of the indicating element, the trouble occurrence detection signal of a high level outputted from the output port 55 of the CPU 32 is indicated by a flashing light of the indicating element. With the above-described arrangement, it becomes possible for the driver to distinguish the two types of information from each other through the indication of the indicating elements, and, also it becomes possible to effectively inform the driver of the occurrence of a trouble because the occurrence of the trouble is indicated by the flashing light. FIG. 2 shows the timing chart indicating the timings of the turning "ON" and "OFF" of the indicating elements 46 and 50.

The flashing light of the indicating element as described above is effected by outputting signals of a high level at an interval of a predetermined period of time from the output port 55 of the CPU 32. When the signals of a high level are outputted at an interval of a predetermined period of time as described above, a transistor 60 repeats "ON" and "OFF" in accordance therewith, and a voltage from the battery power source 44 is applied to the indicating elements 46 and 50 through the input terminals f and g of the operational circuit 10 at an interval of a predetermined period of time. Here, a voltage from the battery power source 44 is still constantly applied to the indicating element for indicating the running mode selected by the selective switch 40, whereby this indicating element is constantly lighted to continue indicating the running mode thus selected, while a voltage from the battery power source 44 is periodically applied to the other indicating element, whereby this indicating element indicates a trouble caused to the vehicle by the flashing light.

In consequence, when the change-over terminal E is selected in the selective switch 40 and the indicating element 46 is constantly lighted for example, if a signal of a high level is outputted from the output port 55 of the CPU 32, then the transistor 60 is ON-OFF operated by this signal, and a voltage from the battery power source 44 is periodically applied to the indicating element 50 through the input terminal f, whereby the indicating element 50 is flashingly lighted to indicate the occurrence of a trouble.

Similarly, when the change-over terminal P is selected in the selective switch 40 and the indicating element 50 is constantly lighted, if a signal of a high level is outputted from the CPU 32, then the indicating element 46 is flashingly lighted to indicate the occurrence of a trouble. Furthermore, when the change-over terminal N is selected in the selective switch 40 and the indicating element 48 is constantly lighted, if a signal of a high level is outputted from the CPU 32, then the indicating elements are flashingly lighted to indicate the occurrence of a trouble.

Meanwhile, voltages inputted or outputted through the respective input terminals f and g of the operational circuit 10 are inputted to the CPU 32 through the input buffer 30 as they are. Because of this, it is preferable that the CPU 32 effects the read-in of the mode signals inputted from the input terminals f and g while no signal of a high level is outputted from the output port 55 of the CPU 32.

For this, in the device of the embodiment, when no signal of a high level is outputted from the output port 55, the CPU 32 constantly reads in the respective mode signals inputted from the input terminals f and g, however, when the signals of a high level are outputted from the output port 55, the CPU 32 alternately effects the outputting of these signals and the read-in of the mode signals inputted from the input terminals f and g as shown in FIG. 2.

Figure 3:
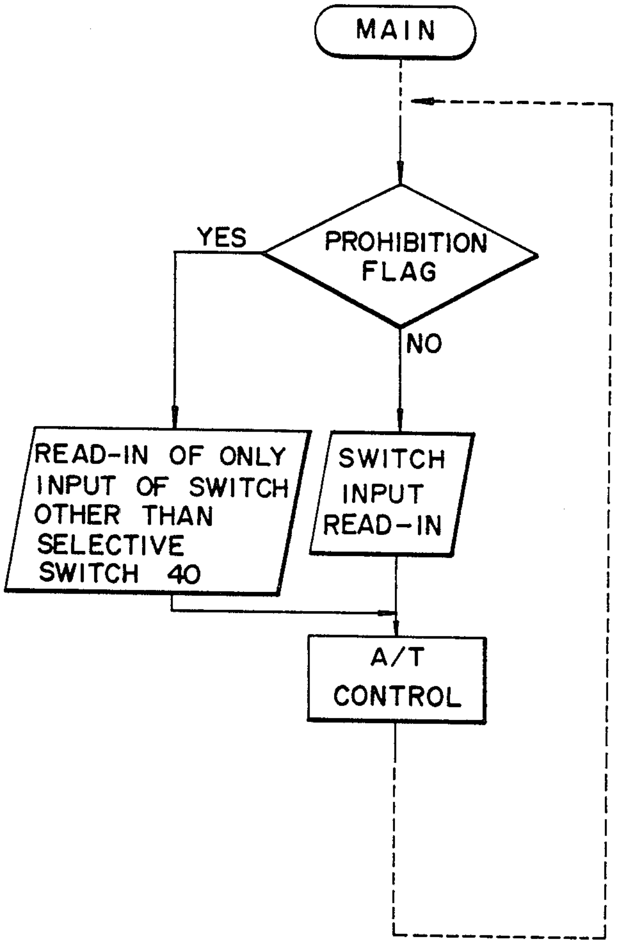
FIGS. 3 and 4 are flow charts showing operation of the device according to the present invention.

FIG. 3 shows the flow chart of the "MAIN" illustrating one example of the processing operation of the CPU 32. In the embodiment, the CPU 32 does not effect the read-in of the signals inputted through the input terminals f and g when a prohibition flag is set, and effects the read-in of the signals thus inputted only when the prohibition flag is reset.

Figure 4:
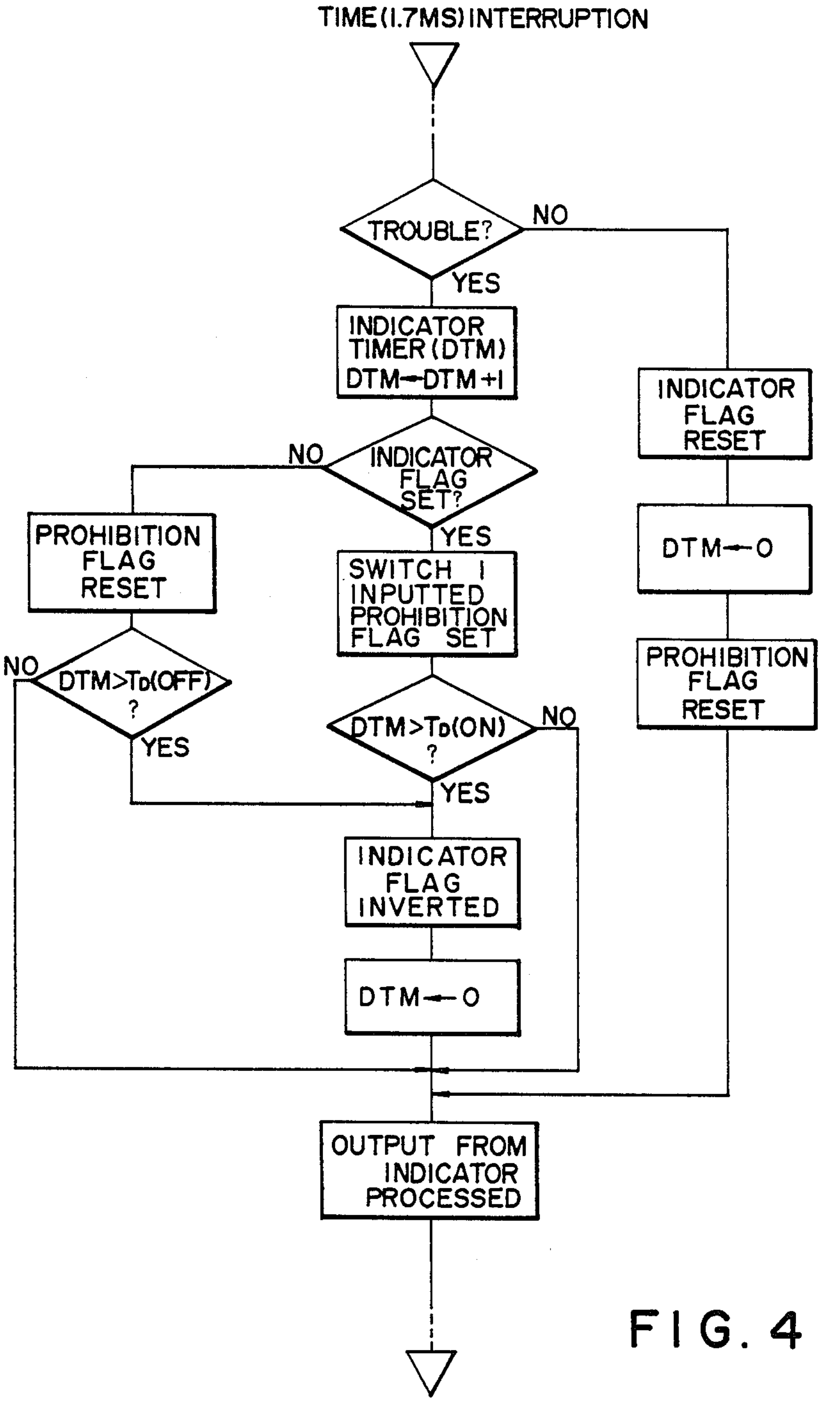

Setting and resetting of this prohibition flag is effected in accordance with the flow chart shown in FIG. 4. This flow chart interrupts into the flow chart of "MAIN" shown in FIG. 3 at a time interval of 1.7 ms.

In this flow chart of the interruption, when no trouble occurs during controlling of the vehicle under the running mode selected, the CPU 32 resets an indicator flag, sets an indicator timer (DTM) to "0", and further, resets the prohibition flag. In consequence, the CPU 32 constantly effects the read-in of the mode selection signals inputted through the input terminals f and g, whereby the vehicle is controlled in accordance with the running mode selected.

Furthermore, when the detector circuits 34, 36 and 38 detect the occurrence of a trouble, the CPU 32 counts up the indicator timer (DTM) and judges as to wherether the indicator flag is set or not. Here, the indicator flag is not set at the initial stage of the occurrence of a trouble. Because of this, the CPU 32 judges as to whether the timer indication of the indicator timer (DTM) has elapsed a preset period of time $T_D$ (off) or not. In the embodiment, this preset period of time $T_D$(off) is set as being equal to an "OFF" time of flashing lights of the indicating elements 46 and 56.

When the timer time of this indicator timer (DTM) exceeds this preset period of time $T_D$(off), the CPU 32 judges that the occurrence of the trouble has continued for the preset period of time or more, inverts the indicator flag to set the same, sets the indicator timer to "0", and starts counting of the indicator timer (DTM) again.

When the indicator flag is set as described above, the CPU 32 outputs a signal of a high level indicating the occurrence of the trouble from the output port 55 thereof, whereby the CPU 32 sets the prohibition flag to stop the read-in of the input signals. This prohibition flag continues for a preset period of time $T_D$ (on), and, upon the elapse of this preset period of time $T_D$ (on), the indicator flag is reset to stop outputting of a signal of a high level from the output port 55, and subsequently, the prohibition flag is reset to effect the read-in of the input signals.

As described above, while the occurrence of the trouble continues, there are repeated alternate changeovers between the settings of the indicator flag and the prohibition flag for the time period of $T_D$ (on) and between the resettings of the indicator flag and the prohibition flag for the time period of $T_D$ (off).

In consequence, when the CPU 32 has detected the occurrence of a trouble, one of the indicating elements 46 and 50 alternately repeates the turn "ON" for the time period of $T_D$ (on) and the turn "OFF" for the time period of $T_D$ (off), to thereby cause the driver to recognize the occurrence of the trouble.

The device according to the present invention is of such an arrangement as described above, whereby, when one of the predetermined running modes is selected by the selective switch, any one of the indicating elements 46, 48 and 50 corresponding to the running mode is constantly lighted to indicate the running mode thus selected for the driver. Then, the CPU 32 reads in the running mode selected by the selective switch 40 through the input terminals f and g, and controls the running conditions of the vehicle in accordance with the running mode selected.

When some trouble occurs with the vehicle and continues for a preset period of time $T_D$ (off), the CPU 32 outputs a signal of a high level from the output port 55 thereof at an interval of a preset period of time, and applies voltages from the battery power source 44 to the indicating elements 46 and 50 through the input terminals f and g of the operational circuit 10 at an interval of a preset period of time.

Here, the voltage from the battery power source 44 is still constantly applied to the indicating element for indicating the running mode selected by the selective switch 40, whereby this indicating element is constantly lighted to continue to indicate the running mode selected. Meanwhile, a voltage from the battery power source 44 is periodically applied to the other indicating element, whereby this indicating element indicates the trouble caused to the vehicle by the flashing light.

As described above, in the device of the embodiment, the indication of one of the running modes which has been selected by the selective switch 40 is made by the constant lighting of the indicating element, and the indication of the signal outputted from the CPU 32 is made by the flashing light, so that the driver can distinguish the both types of information from the indicating elements and recognize the same.

Furthermore, in this embodiment, the indicating elements for indicating the economy mode, normal mode, power mode and the like are used for indicating the output signals from the operational circuit 10, however, these indicating elements need not necessarily be used, but, in the device according to the present invention, indicating elements for indicating other modes may be used for indicating the output signals from the operational circuit 10.

Further, in this embodiment, there is shown the case where the signal for indicating the trouble occurred in the vehicle is outputted from the output port 55 of the CPU 32, however, the device according to the present invention need not necessarily be limited to this, but, other types of signals are outputted through the output port 55 as necessary, so that an indicating element can indicate the same.

Figure 5:
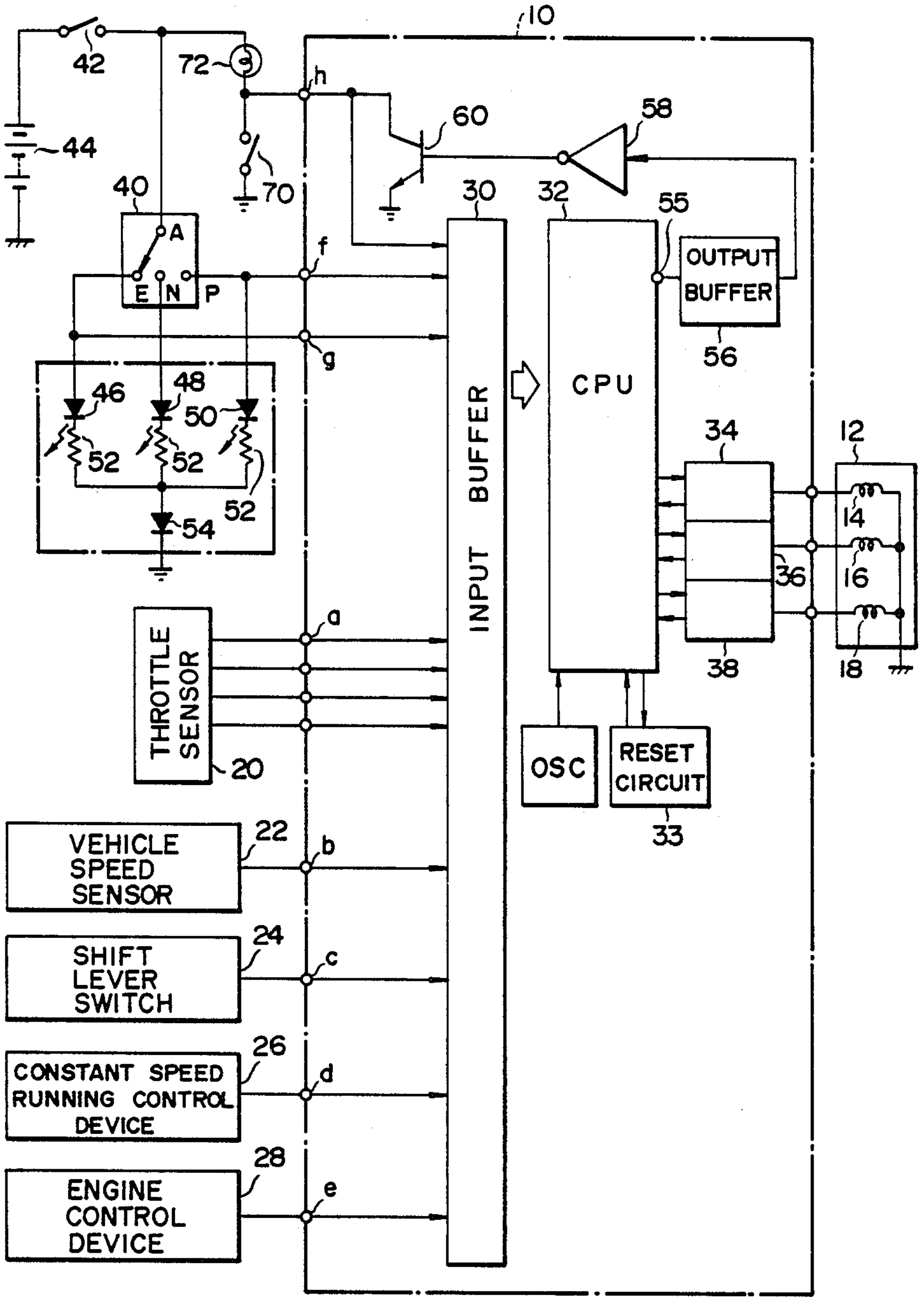
FIG. 5 is a circuit diagram showing another embodiment of the indication device of a vehicle using the indicating elements for a vehicle according to the present invention.

FIG. 5 shows another embodiment of the present invention. The device in this embodiment has an O/D switch 70 for controlling the vehicle to an overdrive running mode.

Here, this O/D switch 70 is formed such that, when an overdrive operation is selected by the driver, a contact point thereof is turned "OFF", and during non-operation, the contact point is turned "ON". One end of the switch 70 is connected to the plus side of the battery power source 44 through the ignition switch 42, and connected to the input buffer 30 through an input terminal h of the operational circuit 10. Additionally, the other end of the switch 70 is connected to ground.

Then, when this O/D switch 70 is operated and the vehicle is controlled to the overdrive running mode, the overdrive running mode is indicated by a mode indicating element 72 provided on an indicating panel around the driver's seat. In the embodiment, this mode indicating element 72 is interposed between the O/D switch 70 and the ignition switch 42. In consequence, when the O/D switch 70 is turned "ON", the indicating element 72 is lighted to indicate that the vehicle is in the normal running conditions. When the O/D switch 70 is turned "OFF", the indicating element 72 is put out to indicate that the vehicle is controlled to the overdrive mode.

When the overdrive mode is indicated by the O/D switch 70 as described above, the CPU 32 controls the vehicle to the overdrive running mode in response to a signal inputted through the input buffer 30.

However, in controlling the vehicle in accordance with the overdrive mode thus selected, there are some cases where the vehicle cannot be controlled to the mode thus selected from some reason or other. Therefore, there are provided a self diagnosing function for detecting such cases.

The characteristic feature of this embodiment resides in that the indicating element can indicate not only the running mode of the vehicle but also occurrence of a trouble in the vehicle.

For this, in the device of the embodiment, when such a trouble as above is detected, a signal of H level is outputted at an interval of a predetermined period of time from the output port 55 of the CPU 32 through the output buffer 56 and the non-inversion type inverter 58.

Then, an output from this no-inversion type inverter 58 is inputted to the base of the transistor 60. The collector of this transistor 60 is connected to the side of the input terminal h, and the emitter thereof is connected to ground. Consequently, when the transistor 60 is turned "ON", a voltage from the battery power source 44 is applied to the indicating element 72, whereby the indicating element 72 is lighted.

Figure 6:
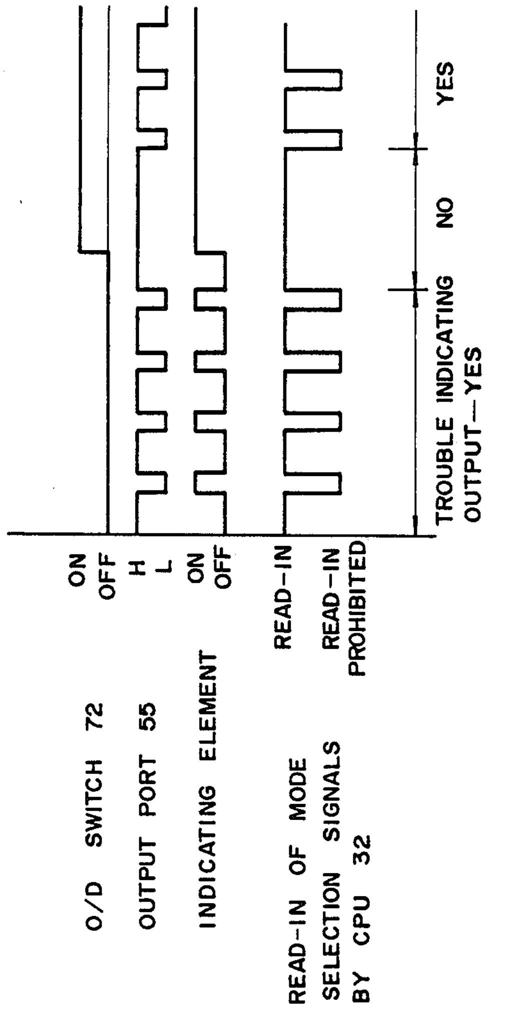
FIG. 6 is a timing chart of the device shown in FIG. 5.
Figure 7:
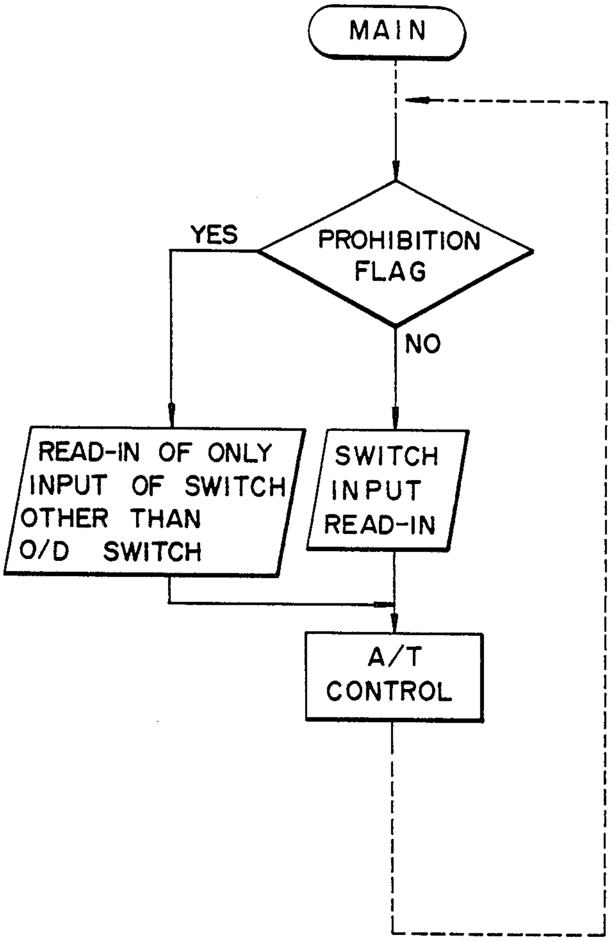
FIGS. 7 and 8 are flow charts showing actions of the device shown in FIG. 5.
Figure 8:
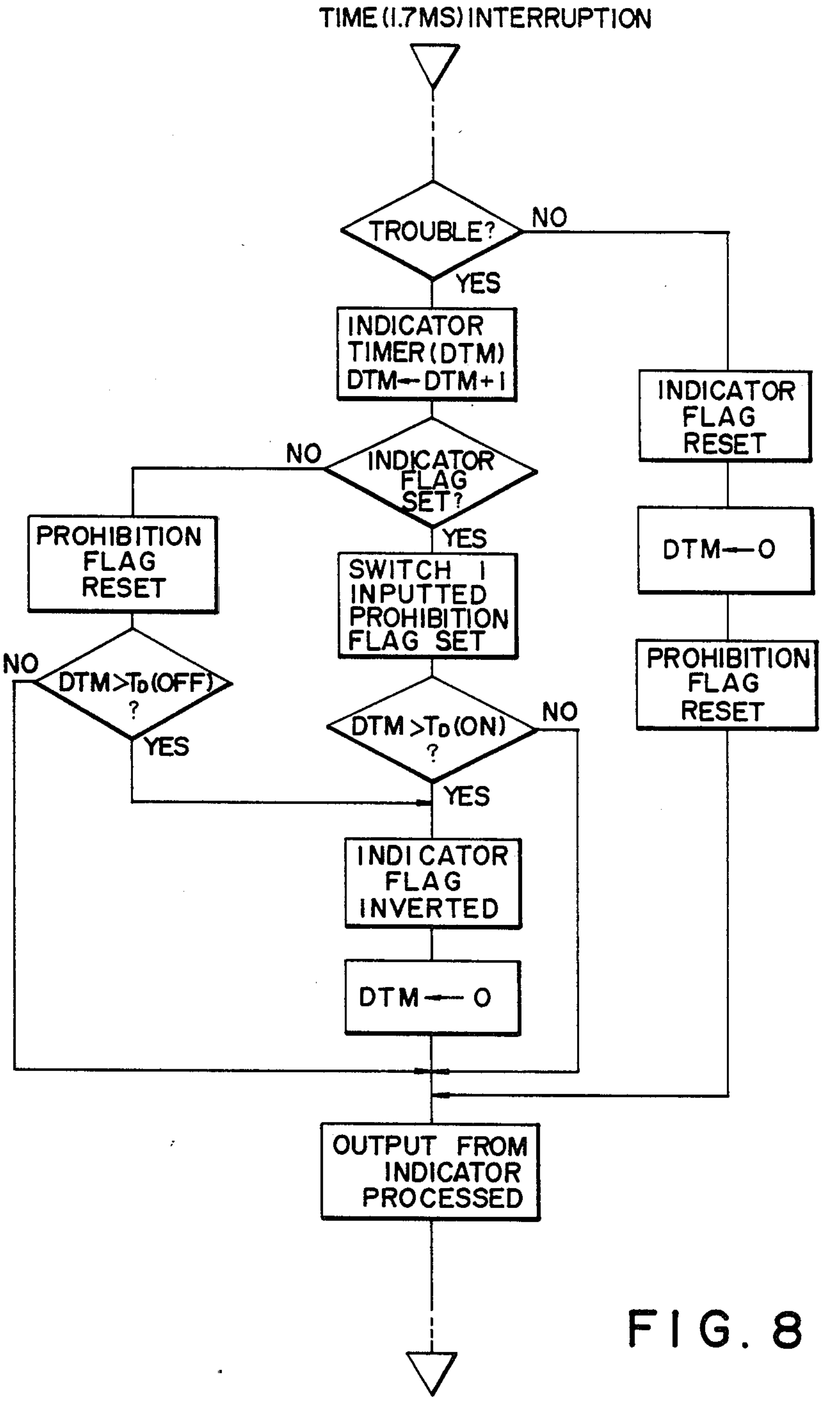

FIG. 6 shows a timing chart illustrating the timings of "ON" and "OFF" of the indicating element 72, and FIGS. 7 and 8 show flow charts illustrating the signal processing actions of the CPU 32.

With the above-described arrangement, in the device of the embodiment, at the time of a normal running condition during which the O/D switch is "ON", the indicating element 72 is constantly "ON", thus informing the driver of the vehicle being controlled to the normal running mode.

Furthermore, when the O/D switch 70 is OFF-operated and the vehicle is controlled to the overdrive running mode, the indicating element 72 is "OFF", thereby informing driver of the vehicle being controlled to the overdrive running mode.

Then, when the vehicle is controlled to the overdrive mode as described above, if some trouble is caused to the vehicle, then a signal of H level is repeatedly outputted from the output port 55 of the CPU 32, and the transistor 60 is interlocked therewith to repeat "ON" and "OFF", whereby a voltage from the battery power source 44 is applied to the indicating element 72 through the input terminal h of the operational circuit 10 at an interval of a predetermined period of time. In consequence, when such a trouble as above occurs, the indicating element 72, which has been "OFF", flickers at an interval of a predetermined period of time, thus informing the driver of occurrence of the trouble.

As has been described hereinabove, the device of the embodiment makes it possible that, when the indicating element 72 is "OFF", it is recognizable that the vehicle is accurately controlled to the overdrive mode, and, when the flickering of the indicating element 72 which has been "OFF" as aforesaid, is begun, it is recognizable that some trouble is caused to the vehicle.

As has been described hereinabove, in the device according to the present invention, the outputs from the operational circuit are fed to the indicating elements for indicating the selected mode connected to the mode selection input terminals of the operational circuit through the mode input terminals, whereby both the control mode and the output of the operational circuit can be outputted to the aforesaid indicating elements for indicating the modes, so that the input and output terminals provided in the operational circuit, the cords in use and the indicating elements can be reduced in number and the device as a whole can be simplified in construction, thereby enabling to obtain high easiness in reading the indications by these indicating elements due to the decrease of the indicating elements in number.

What is claimed is:

1. An indicator device for use with a vehicle that includes a power source, comprising:

a single terminal;

overdrive switch means, connected to said terminal and having an on-state and an off-state, for selecting an overdrive mode in said on state, and selecting a non-overdrive mode in said off state;

an overdrive mode indicating element connected between said overdrive switch means and said power source and connected to said terminal, so that said element is energized by said power source when said overdrive switch means is in said on-state, and is not energized when said overdrive switch means is in said off-state; and operational means, coupled to said terminal, for controlling a transmission device of said vehicle, including:

(a) CPU means for controlling said transmission device in accordance with a state of said overdrive switch means, (b) trouble detecting means for detecting a trouble occurrence in said transmission device, (c) an input buffer, connected to said terminal to receive signals from said overdrive switch means, and (d) a trouble indicating circuit having an output connected to said terminal for outputting a trouble detecting signal as a flickering signal when a trouble occcurrence in said transmission device is detected by said trouble detecting circuit;

so that said overdrive mode indicating element is used for indicatinq a state of said overdrive switch means and also for indicating a trouble occurrence in said transmission device.

2. Apparatus as in claim 1, wherein said trouble indicating circuit includes a transistor with one terminal thereof coupled to a terminal of said power supply, and another terminal thereof coupled to said output terminal, so that when said transitor is turned on, an electric current path is formed through said indicating element.

3. A controlling and monitoring device for a vehicle, comprising:

a single terminal;

an operational state commanding switch, connected to said single terminal, for commanding an operational state of said vehicle;

operational means, connected to said single terminal, for:

(a) detecting a commanding state of said operational state commanding switch, (b) commanding said vehicle to said operational state in accordance with said commanding state, (c) detecting errors in said operational state of said vehicle, and (d) producing an error output when said errors in said operational state are detected;

said operational means including transistor means, having a control input connected to receive said error output and an output connected to said single terminal, for producing an error indicating signal on said single terminal when said error output is produced; and an indicator connected to said sinqle terminal, for indicating both: (a) said operational state commanded by said operational state commanding switch, and (b) an error condition when said error indicating signal is produced.

4. A device as in claim 3, wherein said operational state of said vehicle is an overdrive state.

5. A device as in claim 3, wherein said indicator indicates that said operational state commanded exsists by a continuous lighting operation, and indicates that said error condition exists by a flickering operation.

6. A device as in claim 5, wherein said operational state commanding switch provides a power return to one end of said indicator, another end of said indicator being connected to a power source, and said transistor means of said operational means is a transistor connected in parallel to said operational state commanding switch and connected to said one end of said indicator for producing a flickering state of said indicator by intermittently providing a path to said power return, thereby completing a power circuit thereto with a predetermined duty cycle.

7. A device as in claim 5, wherein one end of said indicator is coupled to a source of power, one end of said transistor means is coupled to ground and another end of said transistor is connected to the other end of said indicator, and wherein said transistor means is controlled by a CPU means to be continually on to indicate said commanded operational state, and to alternately turn on and off to indicate said error state.

8. A device as in claim 5 further comprising a source of power having a first power terminal and a second power terminal such that a current path can be formed between said first and second power terminals, and wherein said indicator has one end connected to said first power terminal and another end connected to said single terminal, said operational state commanding switch having one end connected to said single terminal and another end connected to said second power terminal so that when said operational state commanding switch turns on, it provides said current path through said indicator, and wherein said transistor means has one end connected to said single terminal and another end connected to said second power terminal so that when said transistor means provides a current path between its one and another ends, it produces a current path through said indicator, said operational means driving said transistor means to produce a current path through said indicator with a predetermined duty cycle in response to an error detection, thereby causing said indicator means to light with a flickering operation.

9. A controlling and monitoring device for a vehicle, comprising:

a single terminal;

an operational state commanding switch having two connecting terminals, one connected to said single terminal, for commanding an operational state of said vehicle;

operational means, connected to said single terminal, for:

(a) detecting a commanding state of said operational state commanding switch, (b) commanding said vehicle to said operational state in accordance with said commanding state, (c) detecting errors in said operational state of said vehicle, and (d) producing an error output when said detected operational state does not agree with a commanded operational state;

said operational means including a transistor, having a control input connected to receive said error output and an output terminal connected to said single terminal, for producing an error indicating signal on said single terminal when said error output is produced;

a source of power having a first power terminal and a second power terminal such that a current path can be formed between said first and second power terminals;

an indicator having two terminals, for indicating both: (a) said operational state commanded by said operational commanding switch, and (b) an error condition when said error indicating signal is produced, said indicator having one terminal connected to said first power terminal and another terminal connected to said single terminal;

wherein said operational state commanding switch has one end connected to said single terminal and another end connected to said second power terminal so that when said operational state commanding switch turns on it provides a complete power circuit through said indicator, and wherein said transistor has said output terminal connected to said single terminal and another terminal connected to said second power terminal so that when said transistor turns on, a current path is provided through said indicator, said operational means driving said transistor to produce a current path through said indicator with a predetermined duty cycle, thereby causing said indicator means to light with a flickering operation.

10. A method of controlling and monitoring an operational state in a vehicle using a single terminal to connect signals between an indicator, an operational state commanding switch, and an operational means, said operational commanding switch for commanding an operational state of said vehicle and having two ends, one end for commanding an operational state of said vehicle and connected to said single terminal, and another end connected to a first power terminal, said operational means being connected to said single terminal, and including transistor means, having a control input, and an output terminal connected to said single terminal, said indicator connected to said single terminal and being in series between a second power terminal and said one end of operational state commanding switch such that a commanding state of said operational state commanding switch also connects said first power terminal to an end of said indicator, wherein a current flow between said first and said second power terminals is formed by either of said operational commanding switch being on, or said transistor means being on, thereby enabling said indicator to light, comprising the steps of:

detecting said commanding state of said operational state commanding switch;

commanding said vehicle to said operational state in accordance with said commanding state;

detecting said operational state of said vehicle;

producing an error indication output and connecting said error indication output to the control input of said transistor means, when an error is detected in said operational state;

using said transistor means to produce an error indicating signal of a predetermined duty cycle on said output terminal when said error output is produced, said error indicating signal being a power signal connecting said end of said indicator to said first power terminal with said duty cycle; and using said indicator, connected to said single terminal, for indicating both: (a) said operational state commanded by said operational comanding switch by a continuous lighting, and (b) an error condition when said error indicating signal is produced, by a flickering lighting.

* * * * *